United States Patent [19]

Aratani et al.

[11] Patent Number: 4,955,007
[45] Date of Patent: Sep. 4, 1990

[54] THERMOMAGNETIC RECORDING METHOD APPLYING POWER MODULATED LASER ON A MAGNETICALLY COUPLED DOUBLE LAYER STRUCTURE OF PERPENDICULAR ANISOTROPY FILM

[75] Inventors: Katsuhisa Aratani, Chiba; Tomiji Tanaka, Saitama, both of Japan

[73] Assignee: Sony Corporation, Tokyo, Japan

[21] Appl. No.: 87,440

[22] Filed: Aug. 20, 1987

[30] Foreign Application Priority Data

Aug. 20, 1986 [JP] Japan .................................. 61-294961
Aug. 20, 1986 [JP] Japan .................................. 61-194962
Aug. 22, 1986 [JP] Japan .................................. 61-195616

[51] Int. Cl.⁵ .................... G11B 11/14; G11B 13/04
[52] U.S. Cl. .................................. 369/13; 360/59; 360/114
[58] Field of Search ............... 369/13; 360/114, 59; 365/122, 10, 32; 428/694, 900

[56] References Cited

U.S. PATENT DOCUMENTS

| 4,126,494 | 11/1978 | Imamura et al. | 365/122 |
| 4,556,291 | 12/1985 | Chen | 369/13 |
| 4,612,587 | 9/1986 | Kaneko et al. | 360/114 |
| 4,628,485 | 12/1986 | Tanaka et al. | 365/122 |
| 4,649,519 | 3/1987 | Sun et al. | 365/122 |
| 4,701,881 | 10/1987 | Tanaka et al. | 365/122 |

FOREIGN PATENT DOCUMENTS

| 0225141 | 6/1987 | European Pat. Off. | 360/114 |
| 0619618 | 12/1986 | Fed. Rep. of Germany | 369/13 |
| 58-50639 | 3/1983 | Japan | 369/13 |
| 58-57646 | 4/1983 | Japan | 360/114 |
| 58-108045 | 6/1983 | Japan | 369/13 |
| 58-171738 | 10/1983 | Japan | 369/13 |

OTHER PUBLICATIONS

Nikon, "Magneto-Optic Memories Begin to Look Like a Good Bet", Electronics/Apr. 16, 1987, p. 33.
Nizutani (I), The Japanese Patent Abstract, vol. 9, No. 86, p. 349, Apr. 16, 1985.
Tanaka, The Japanese Patent Abstract, vol. 6, No. 34, p. 104, Mar. 02, 1982.

Primary Examiner—Steven L. Stephan
Assistant Examiner—Hoa Nguyen
Attorney, Agent, or Firm—Hill, Van Santen, Steadman & Simpson

[57] ABSTRACT

Thermomagnetic recording method using a thermomagnetic recording medium having a superposed layer of magnetically coupled first and second magnetic thin films is disclosed. The magnetic thin film includes a portion where the respective magnetic moments of the first and second thin films are coupled in opposite directions to each other. The method comprises heating the superposed layer in a first heating state in which the superposed layer is heated at a temperature $T_1$ which is higher than the Curie temperature $T_{C1}$ of the first magnetic thin film and will not cause the inversion of the magnetic moment of the second magnetic thin film or in a second heating state in which the superimposed layer is heated at a temperature $T_2$ which is higher than the Curie temperature $T_{C1}$ and is high enough to cause the inversion of the magnetic moment of the second magnetic thin film by modulating heating condition according to an information signal to be recorded; and forming recording magnetization on the thermomagnetic recording medium by cooling the heated superimposed layer of the thermomagnetic recording medium. In the method, real-time overwriting information can be achieved without using a modulated external magnetic field.

5 Claims, 6 Drawing Sheets

THERMOMAGNETIC RECORDING METHOD APPLYING POWER MODULATED LASER ON A MAGNETICALLY COUPLED DOUBLE LAYER STRUCTURE OF PERPENDICULAR ANISOTROPY FILM

BACKGROUND OF THE INVENTION

The present invention relates to a thermomagnetic recording method using a laser beam to write data on a thermomagnetic recording medium, and more particularly relates to the method using a power modulated laser beam which can overwrite data without using external magnetic field modulation.

In an optomagnetic recording method or a thermomagnetic recording method, a recording medium having a magnetic thin film having perpendicular anisotropy is initialized by magnetizing the thin film beforehand in one direction perpendicular to the surface of the recording medium, and then a bit perpendicularly magnetized in a direction opposite the initial direction of magnetization by local heating of the recording medium, for example, by laser beam irradiation to record binary information.

In the optomagnetic recording method or the thermomagnetic recording method, the recorded information needs to be erased (initialization of the recording medium) prior to rewriting information, and hence it is impossible to carry out recording at a high transmission rate. Several overwrite systems, namely, recording systems not requiring such an independent erasing process preceding to rewriting, have been proposed. Among the thermomagnetic recording methods for overwriting system, prospective methods are, for example, a thermomagnetic recording method using an external magnetic field modulation in which the polarity of an external magnetic field acting on a recording medium is inverted according to an information signal, and a thermomagnetic recording method of a two-head system employing an erasing head initialize the medium prior to recording in addition to a recording head. In the thermomagnetic recording method of an external magnetic field modulation system, for example, as disclosed in Japanese Patent Provisional Publication (Kokai) No. 60-48806, to record information on an amorphous ferrimagnetic thin film recording medium having an easy direction of magnetization perpendicular to the surface of the thin film, a magnetic field of a polarity corresponding to an input digital signal is applied to a region on the recording medium to be irradiated by a heating beam.

However, high-speed recording at a high information transmission rate by the thermomagnetic recording method of an external magnetic field modulation system requires an electromagnet capable of operating at a very high frequency on the order of megahertz (MHz). It is difficult to make such an electromagnet. Even if such an electromagnet is available, such an electromagnet is not capable of practical application due to its high power consumption rate and high heat generation. The thermomagnetic recording method of a two-head system has disadvantages that an additional head is necessary, the two heads must be spaced apart, load on the driving system increases to deteriorate the economic effect, and the apparatus is not suitable for mass production.

OBJECT AND SUMMARY OF THE INVENTION

Accordingly, it is an object of the present invention to provide a thermomagnetic recording method capable of overwriting information.

It is another object of the present invention to provide a thermomagnetic recording method using a power modulated laser beam without using a modulated external magnetic field.

It is further object of the present invention to provide a thermomagnetic recording method in which, recorded information is stable upon preservation.

It is still further object of the present invention to provide a thermomagnetic recording method in which signal reproduction can be achieved with high S/N ratio.

According to the present invention, there is provided a thermomagnetic recording method using a thermomagnetic recording medium having a superposed film formed of magnetically coupled first and second magnetic thin films and including a portion in which the respective magnetic moments of the first and second magnetic thin films are coupled opposite to each other which comprises heating the thermomagnetic recording medium in a first heating state where the thermomagnetic recording medium is heated at a temperature $T_1$ higher than the Curie temperature $T_{C1}$ of the first magnetic thin film and will not cause the inversion of the magnetic moment of the second magnetic thin film or in a second heating state in which the thermomagnetic recording medium is heated at a temperature $T_2$ which is higher than the Curie temperature $T_{C1}$ and is high enough to cause the inversion of the magnetic moment of the second magnetic thin film by modulating heating condition according to an information signal to be recorded; and cooling the heated thermomagnetic recording medium to record binary information. By "modulating heating" is meant varying the applied heating condition in accordance with the information to be recorded.

Overwriting information is achieved simply by modulating the intensity or duration of irradiation of a heating beam, such as a laser beam, according to an information signal to be recorded.

DESCRIPTION OF THE PREFERRED EMBODIMENTS

Figure 1:
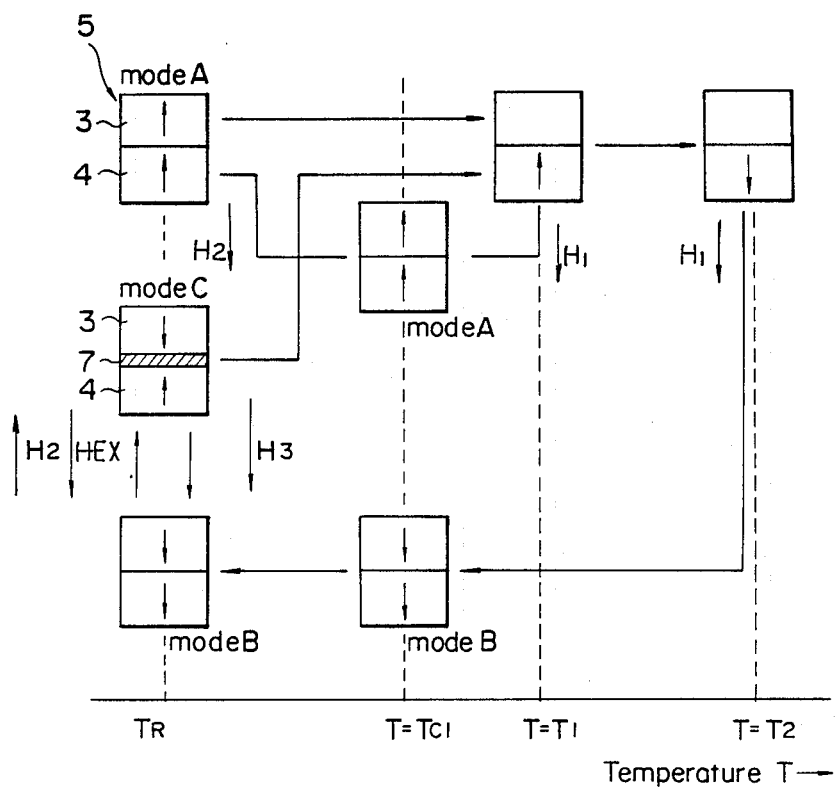
FIGS. 1 and 8 are diagrammatic illustrations of assistance in explaining the procedure of implementing preferred embodiments of the present invention, showing modes of magnetization.

FIG. 1 shows the magnetization state of the superposed film structure 5, formed of a first magnetic thin film 3 and a second magnetic thin film 4 magnetically coupled with each other.

The superposed film structure 5 having a recording portion in which the respective magnetic directions of the respective magnetically coupled magnetic moments of a first magnetic thin film 3 and a second magnetic thin film 4 are the same (state A) and a recording portion in which the respective directions of the magnetically coupled magnetic moments are opposite to each other (state C) is heated in a heating mode in which the laminated film is heated at a temperature $T_1$ which is higher than the Curie temperature $T_{C1}$ of the first magnetic thin film 3 and will not cause the inversion of the magnetic moment of the second magnetic thin film 4 under the influence of an external magnetic field $H_1$ or in a heating mode in which the laminated film is heated at a temperature $T_2$ which is higher than the Curie temperature $T_{C1}$ and is high enough to cause the inversion of the magnetic moment of the second magnetic thin film 4 under the influence of the external magnetic field $H_1$ by modulating heating condition according to an information signal to be recorded, and then the heated laminated film is cooled for recording magnetization of the thermomagnetic recording medium.

G-1. Constitution of the Thermomagnetic Recording Medium

Figure 2:
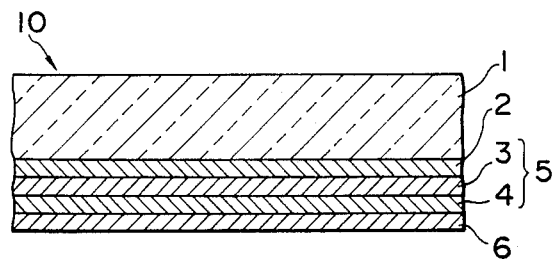
FIG. 2 is a schematic, fragmentary sectional view of a thermomagnetic recording medium employed in the embodiment of the present invention, showing the laminated construction.

The constitution of a thermomagnetic recording medium employed in the first embodiment of the present invention will be described briefly with reference to FIG. 2. A transparent dielectric film 2 serving as a protective film or an interference film is formed over one surface (lower surface, in FIG. 2) of a transparent substrate 1 such as a glass plate or an acrylic resin plate. A double-layer magnetic film 5 comprising a first magnetic thin film 3 and a second magnetic thin film 4 is formed over the transparent dielectric film 2. The surface (lower surface) of the double-layer magnetic film 5 is coated with a dielectric film 6 serving as a protective film. The dielectric films 2 and 6 may be omitted or the dielectric film 6 may be a metallic film. Further a metallic film (not shown) may be formed over the dielectric film 6.

There are various possible magnetic materials for forming the first magnetic thin film 3 and second magnetic thin film of the double-layer magnetic film 5. In this embodiment, the magnetic material is assumed to be an amorphous alloy $RE_xTM_{1-x}$ containing x=10 to 40 atm % of one or more than one of rare earth metals (RE) such as Nd, Sm, Gd, Tb, Dy and Ho, and 1-x=90 to 60 atm % of one or more than one of transition metals such as Cr, Mn, Fe, Co, Ni and Cu. The magnetic material may contain a small amount of elements other than those rare earth metals and transition metals. In such a magnetic amorphous RE-TM alloy, the magnetic moment of RE and that of TM are coupled antiparallel with each other except when RE is Nd or Sm. Accordingly, the amorphous magnetic RE-TM alloy is so-called ferrimagnetic material, and the total magnetization is the difference between the respective sublattice magnetization of RE and TM (addition of the respective sublattice magnetization when the direction of magnetic moment is taken into consideration). When RE is either Nd or Sm, or a mixture of Nd and Sm, the respective magnetic moments of RE and TM are coupled in parallel, and hence the amorphous magnetic RE-TM alloy is so-called ferromagnetic material. In this case, the total magnetization is the addition of the respective sublattice magnetization of RE and TM. In this embodiment, RE is Gd, Tb, Dy or Ho.

Figure 3:
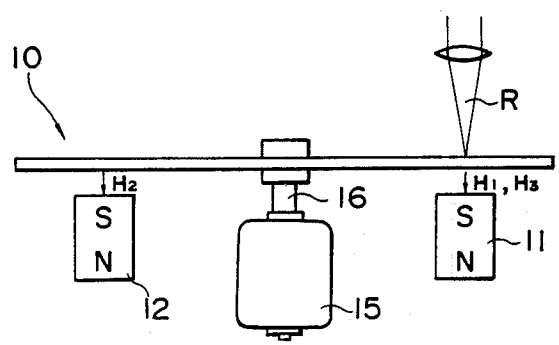
FIGS. 3 and 9 are schematic views showing exemplary recording apparatuses.

Laser light R for recording or reproducing is projected, for example, as shown in FIG. 3, on the thermomagnetic recording medium 10 from the side of the transparent substrate 1 (FIG. 2), while the respective magnetic field $H_1$ and $H_2$ of magnets 11 and 12 are applied to the thermomagnetic recording medium 10 from the side of the protective dielectric film 6 as shown in FIG. 3 or from the side of the transparent substrate 1. In FIG. 3, the magnets 11 and 12 are spaced apart, however, as will be described hereinafter, the magnets 11 and 12 may be disposed adjacent to each other or the magnets 11 and 12 may be the same magnets. In the case of FIG. 3, the thermomagnetic recording medium 10 is a disk, which is driven for rotation by the spindle 16 of a driving motor 15, and the magnets 11 and 12 are different from each other in polarity; the magnets 11 and 12 may be the same in polarity, which will be described hereinafter.

Figure 4:
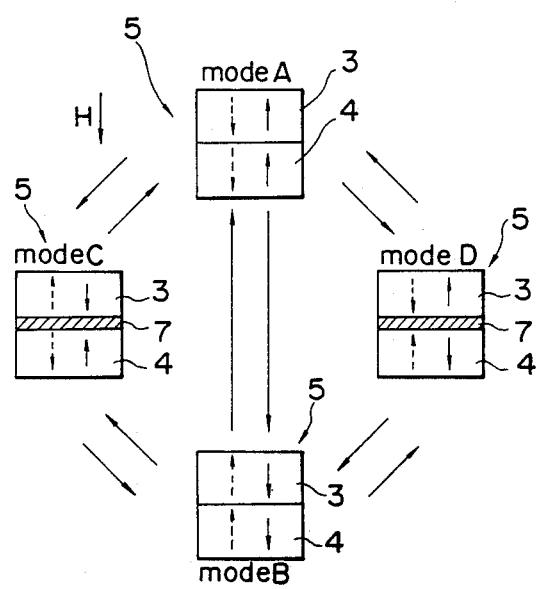
FIGS. 4 and 10 are illustrations of assistance in explaining the transition of modes of magnetization.

Possible modes of the double-layer magnetic film 5 formed by superposing the magnetic thin films 3 and 4 of a RE-TM alloy in a temperature range below the respective Curie temperatures $T_{C1}$ and $T_{C2}$ of the magnetic thin films 3 and 4 are manifested by four modes A to D as shown in FIG. 4. The respective easy directions of magnetization of the magnetic thin films 3 and 4 are supposed to be perpendicular to the surface of the films, namely, the magnetic thin films 3 and 4 are supposed to be so-called perpendicular anisotropy magnetic thin films, however, only either one of the magnetic thin films 3 and 4 may be a perpendicular anisotropy magnetic thin film.

Referring to FIG. 4, in the modes A and B, the respective directions of the respective magnetic moments of the respective TMs of the first magnetic thin film 3 and the second magnetic thin film 4 are the same as indicated by arrows shown by solid lines, and those of the REs of the magnetic thin film 3 and the magnetic thin film 4 are the same as indicated by arrows shown by broken lines. In the modes C and D, the respective directions of the respective magnetic moments of the respective TMs of the first magnetic thin film 3 and the second magnetic thin film 4 are opposite to each other as indicated by arrows shown by solid lines in FIG. 4, and those of the REs of the magnetic thin film 3 and the magnetic thin film 4 are opposite to each other as indicated by arrows shown by broken lines in FIG. 4, so that a region where the directions of the magnetic moment of the TM and the magnetic moment of RE change through an angle of 180°, namely, an interface magnetic wall, is formed at the interface of the first magnetic thin film 3 and the second magnetic thin film 4. This interface magnetic wall is designated as a interface wall 7. An interface magnetic wall energy per unit area ($\sigma w$ erg/cm$^2$) is stored in the interface wall 7.

G-2. Transition of Mode of Magnetization

Magnetic energies $E_A$, $E_B$, $E_C$ and $E_D$ (erg/cm$^2$) of the modes A to D shown in FIG. 4 when an external magnetic field H (Oe), is applied to the double-layer magnetic film 5 are expressed approximately by Zeeman energy and the interface wall energy density $\sigma_w$ in erg/cm$^2$ unit as follows $$E_A = -M_{s1}h_1H - M_{s2}h_2H$$
$$E_B = M_{s1}h_1H + M_{s2}h_2H$$
$$E_C = M_{s1}h_1H - M_{s2}h_2H + \sigma_w$$
$$E_D = -M_{s1}h_1H + M_{s2}h_2H + \sigma_w$$

where $M_{s1}$ and $M_{s2}$ are the saturation magnetizations $M_s$ (emu/cm$^3$) of the magnetic thin films 3 and 4, respectively, and $h_1$ and $h_2$ are the respective thicknesses (cm) of the magnetic thin films 3 and 4. The saturation magnetization $M_s$ is obtained by subtracting the sublattice magnetization $M_{TM}$ of TM (transition metal) from the sublattice magnetization $M_{RE}$ of RE (rare earth metal). The saturation magnetization $M_s$ is defined generally by $$M_s = |M_{RE} - M_{TM}|$$

However, in the present invention, the saturation magnetization $M_s$ is defined by $$M_s = M_{RE} - M_{TM}$$

Accordingly, when $M_{RE} \geq M_{TM}$ or $M_{RE} < M_{TM}$, $M_s \geq 0$, or $M_s < 0$, respectively. Further, the respective rectangular ratios, i.e., the ratio of $M_s$ to $H_c$, of the magnetic thin films 3 and 4 are 1 (one), and the direction of the external magnetic field $H_1$ indicated by an arrow in FIG. 4 is supposed to be a positive direction. However, in practice, the rectangular ratio need not necessarily be 1 (one). Although the magnetic energies of the modes A to D are determined approximately on the basis of Zeeman energy and the magnetic domain wall energy density ow, more strictly, the stray magnetic field of the adjacent bits must be taken into consideration, however, the stray magnetic field is not taken into consideration herein.

When the coercive force of the first magnetic thin film or magnetic field to invert the magnetization of the first magnetic thin film 3 is $H_{c1}$ (Oe), and that of the second magnetic thin film 4 is $H_{c2}$, the energy necessary for inverting the magnetization of the first magnetic thin film 3, namely, the coercive force energy $E_1$ (erg/cm$^2$), and the energy necessary for inverting the magnetization of the second magnetic thin film 4, namely, the coercive force energy $E_2$ (erg/cm$^2$), are expressed by $$E_1 = 2|M_{s1}|h_1H_{c1}$$

$$E_2 = 2|M_{s2}|h_2H_{c2}$$

To change the mode of magnetization from a mode i (i=A to D) to a mode j (j=A to D, j≠i) $E_i - E_j = E_{ij}$ must be greater than the coercive force energy ($E_1$, $E_2$ or $E_1 + E_2$). For example, to change the mode of magnetization from the mode A to the mode B, an inequality:

$$E_{AB} = E_A - E_B > E_1 + E_2$$

must be satisfied. Accordingly, $$-2M_{s1}h_1H - 2M_{s2}h_2H > 2|M_{s1}|h_1H_{c1} + 2|M_{s2}|h_2H_{c2}$$

G-3. Change of mode of Magnetization According to Temperature Variation-(1)

Change of the mode of magnetization of the magnetic thin films of the double-layer magnetic film 5 with temperature variation caused by laser irradiation or the like will be described with reference to FIG. 1.

Suppose that a recording bit of the double-layer magnetic film 5 of the thermomagnetic recording medium lo is in the mode A (FIG. 1) at room temperature $T_R$, and the bit of the double-layer magnetic film 5 in the mode A is irradiated by laser light for recording. The intensity of the laser light or the duration of laser irradiation is controlled according to a recording signal to heat the double-layer magnetic film 5 selectively to a first temperature $T_1$ or to a second temperature $T_2$. The first temperature $T_1$ is higher than the Curie temperature $T_{c1}$ of the first magnetic thin film 3 and is a temperature at which the inversion of magnetization of the second magnetic thin film 4 will not occur when the second magnetic thin film 4 is subjected to the influence of an external magnetic field $H_1$, while the second temperature $T_2$ is higher than the first temperature $T_1$ and is a temperature high enough to cause the inversion of magnetization of the second magnetic thin film 4 when the second magnetic thin film 4 is subjected to the influence of the external magnetic field $H_1$. That is, an area around the bit heated by the laser light is under the influence of the external magnetic field $H_1$ of the magnet 11, which is strong enough to invert the magnetization of the second magnetic thin film 4 at the temperature $T_2$.

Upon cooling the double-layer magnetic film 5 to the temperature $T_{c1}$ after the same has been heated to such a temperature, a spontaneous magnetization appears in the first magnetic thin film 3. The external magnetic field Hi, and the saturation magnetization $M_{s1}$ and thickness $h_1$ of the first magnetic thin film 3 are determined selectively to meet an inequality:

$$\sigma_w > 2|M_{s1}|h_1|H_1|$$

at the temperature T (near the temperature $T_{c1}$) where a spontaneous magnetism appears in the first magnetic thin film 3 to make the exchange energy acting between the two magnetic thin layers dominant rather than the Zeeman energy in determining the direction of the magnetism of the first magnetic thin film 3. Accordingly, when the temperature T of the double-layer magnetic film 5 coincides with the temperature $T_{c1}$, the double-layer magnetic film 5 is in the mode A or the mode B where the respective directions of magnetization of the first and second magnetic thin films are the same. When the heating temperature is $T_1$, the mode A is established upon cooling. And, when the heating temperature is $T_2$, the mode B is established, upon cooling.

As shown in FIG. 3, the magnet 12 applies an external magnetic field $H_2$ meeting conditions which will be described in G-4 to the thermomagnetic recording medium 10 at a temperature near the room temperature $T_R$ to invert the magnetism of the second magnetic thin film 4, so that the mode C (FIG. 4) is established in the double-layer magnetic film 5.

When a recording bit in the mode C of the double-layer magnetic film 5 of the thermomagnetic recording medium 10 is heated to a temperature above the temperature $T_{c1}$, the magnetization of the first magnetic thin film 3 disappears and the same state of magnetization as that of a recording bit in the mode A in the initial state heated to the temperature above the temperature $T_{c1}$ is established in the recording bit. Accordingly, the mode A is established as the recording bit is cooled after being heated to the temperature $T_1$, while the mode B is established in the recording bit cooled after being heated to the temperature $T_2$. Thus, a mode of recording magnetization according to the temperature $T_1$ or $T_2$ is obtained. As described hereinafter, a recording bit in the mode B is changed into a recording bit in the mode C at least prior to the successive overwriting operation to turn the direction of magnetization of the second magnetic thin film 4 in the direction of magnetization of the second magnetic thin film in the mode A.

A recording bit in which the respective directions of the magnetically coupled magnetic moments of the first magnetic thin film 3 and second magnetic thin film 4 of the double-layer magnetic film 5, namely, a recording bit in the mode A, and a recording bit in which the respective directions of magnetically coupled magnetic moments of the same are opposite to each other, namely, a recording bit in the mode C, are heated to the temperature $T_1$ or $T_2$ according to information signals by regulating the heating condition to establish new mode of magnetization for recording magnetization regardless of the initial mode of magnetization, and thereby overwrite is achieved.

G-4. Conditions for Overwrite-(1)

Conditions for overwrite will be described hereinafter.

In changing the temperature T of the double-layer magnetic film 5 under the influence of the magnetic field $H_1$ as shown in FIG. 1, conditions for restraining the mode A from changing to the other modes in the temperature range from the room temperature $T_R$ to a temperature below the Curie temperature $T_{c1}$ of the first magnetic thin film 3 ($T_R \leq T < T_{c1}$) are expressed by inequalities:

$$-2M_{s1}h_1H_1 - 2M_{s2}h_2H_1 < 2|M_{s1}|h_1H_{c1} - 2|M_{s2}|h_2H_{c2}$$

$$-2M_{s1}h_1H_1 - \sigma_w < 2|M_{s1}|h_1H_{c1}$$

$$-2M_{s2}h_2H_1 - \sigma_w < 2|M_{s2}|h_2H_{c2}$$

and conditions for restraining the mode C from changing to the other modes are expressed by inequalities:

$$2M_{s1}h_1H_1 + \sigma_w < 2|M_{s1}|h_1H_{c1}$$

$$-2M_{s2}h_2H_1 + \sigma_w < 2|M_{s2}|h_2H_{c2}$$

A condition for restraining the inversion of sublattice magnetization of the second magnetic thin film 4 while the temperature T of the double-layer magnetic film 5 is in the range from a temperature above the temperature $T_{c1}$ to a temperature below the second temperature $T_2$ ($T_{c1} < T < T_2$) is expressed by an inequality:

$$|H_1| < H_{c2}$$

and a condition for causing the inversion of the sublattice magnetization of the second magnetic thin film 4 when the temperature T of the double-layer magnetic film 5 is above the temperature $T_2$ is expressed by an inequality:

$$|H_1| > H_{c2}$$

In cooling the double-layer magnetic film 5 after heating the same to such a temperature, a condition for allowing the direction of the magnetization of the first magnetic thin film 3 is determined by the exchange coupling with the direction of the magnetization of the second magnetic thin film 4, upon the reduction of the temperature of the recording bit of the double-layer magnetic film 5 of the thermomagnetic recording medium 10 approximately to the Curie temperature $T_{c1}$ of the first magnetic thin film 3 (T is approximately equal to $T_{c1}$) so that $$\sigma_w > 2|M_{s1}|h_1|H_1|$$

and conditions for restraining the mode A from changing to the other modes in the temperature range of $T_R \leq T < T_{c1}$ are the same as those in the heating process, while conditions for restraining the mode B from changing to the other modes are $$2M_{s1}h_1H_1 + 2M_{s2}h_2H_1 < 2|M_{s1}|h_1H_{c1} + 2|M_{s2}|h_2H_{c2}$$

$$2M_{s1}h_1H_1 - \sigma_w < 2|M_{s1}|h_1H_{c1}$$

$$2M_{s2}h_2H_1 - \sigma_w < 2|M_{s2}|h_2H_{c2}$$

Conditions for restraining the mode A from changing to the other modes when the external magnetic field is $H_2$ (down as shown in FIG. 1) at room temperature are $$-2M_{s1}h_1H_2 - 2M_{s2}h_2H_2 < 2|M_{s1}|h_1H_{c1} + 2|M_{s2}|h_2H_{c2}$$

$$-2M_{s1}h_1H_2 - \sigma_w < 2|M_{s1}|h_1H_{c1}$$

$$-2M_{s2}h_2H_2 - \sigma_w < 2|M_{s2}|h_2H_{c2}$$

and conditions for causing the mode B to change into the mode C (by applying the upwardly directed $H_2$ field as shown in FIG. 1) are $$2M_{s1}h_1H_2 + 2M_{s2}H_2H_2 < 2|M_{s1}|h_1H_{c1} + 2|M_{s2}|H_2H_{c2}$$

$$2M_{s1}h_1H_2 - \sigma_w < 2|M_{s1}|h_1H_{c1}$$

$$2M_{s2}H_2H_2 - \sigma_w > 2|M_{s2}|h_2H_{c2}$$

Thus the use of a two-layer magnetic film 5 which meets all the foregoing conditions enables overwrite.

In the foregoing description, the variation of mode of magnetization has been explained with reference to the modes A, B and C, however, overwrite is possible when the modes A, B and D are employed when the direction of magnetization of the second magnetic thin film 4 is to be turned in a direction opposite to that described hereinbefore. That is, in such a case, the modes A, B, C and D correspond to the modes B, A, D and C of the foregoing embodiment, respectively, and the saturation magnetization Ms is defined by $$Ms = M_{TM} - M_{RE}$$

to apply the foregoing conditions for overwrite without change.

G-5. State of Magnetization for Reproduction and Preservation-(1)

To enable overwrite, it is necessary, as mentioned hereinbefore, that the directions of magnetization in the second magnetic thin film 4 are the same regardless of the signal recording condition (the direction of magnetization of the first magnetic thin film 3), and there are recording bits in which the respective directions of the sublattice magnetization of the first magnetic thin film 3 and second magnetic thin film 4 of the double-layer magnetic film 5 are the same and recording bits in which the respective directions of the sublattice magnetization of the first magnetic thin film 3 and the second magnetic thin film 4 are opposite to each other. However, problems occur in reproducing recorded information or in preserving the thermomagnetic recording medium, when there are recording bits in which the directions of sublattice, magnetization are antiparallel.

When the respective directions of sublattice magnetization of the magnetic thin films 3 and 4 are antiparallel, the thickness $h_1$ of the first magnetic thin film 3 needs to be thick to improve the reproducing characteristics, and it is preferable, as apparent from the calculation of the magnetizing process, that the thickness $h_2$ Of the second magnetic thin film 4 also is thick, and hence the thickness of the double-layer magnetic film 5 is considerably large, which requires a laser having a large output capacity. However, under existing circumstances, it is difficult to acquire such a laser having a large output capacity of small size, for example, a semiconductor laser. Furthermore, even if the thermomagnetic recording medium is preserved at room temperature, the double-layer magnetic film having the magnetic thin films in which the respective directions of sublattice magnetization are antiparallel is unstable to heat and magnetic field. Still further, in a recording bit in which the directions of secondary lattice magnetization are antiparallel, only the magnetic thin film 3 stores information. Therefore, in reproducing the recorded information by the use of Kerr effect, the information can be read only from the side of the magnetic thin film 3. Particularly, when the Curie temperature $T_{c2}$ Of the second magnetic thin film 4 is higher than the Curie temperature $T_{c1}$ of the first magnetic thin film 3 ($T_{c1} < T_{c2}$), the Kerr rotational angle $\Theta k_2$ Of the second magnetic thin film 4, in general, is greater than the Kerr rotational angle $\Theta k_1$ of the first magnetic thin film 3 ($\Theta k_1 < \Theta k_2$). Accordingly, the SN ratio is improved when the signal is read from the side of the second magnetic thin film 4, however, such a way of reading signals is impossible when the directions of sublattice magnetization of the magnetic thin films are antiparallel. Accordingly, it is desirable that the direction of sublattice magnetization of the second magnetic thin film 4 and the direction of sublattice magnetization of the first magnetic thin film are the same in reproducing recorded information or in preserving the thermomagnetic recording medium.

Conditions for making the respective directions of sublattice magnetization of the first and second magnetic thin films will be described hereinafter. Conditions for changing the mode C into the mode B by applying a third external magnetic field $H_3$ (the positive direction of the magnetic field is indicated by the arrow shown in FIG. 1) to a magnetic recording medium having recording bits in the modes A and C are $$2M_{s1}h_1H_3 + \sigma_w < 2|M_{s1}|h_1H_{c1}$$

$$-2M_{s2}h_1H_3 + \sigma_w > 2|M_{s2}|h_2H_{c2}$$

At the same time, necessary conditions for inhibiting the transition of the mode A to the mode B, C or D are $$-2M_{s1}h_1H_3 - 2M_{s2}h_2H_3 < 2|M_{s1}|h_1H_{c1} + 2|M_{s2}|h_2H_{c2}$$

$$-2M_{s1}h_1H_3 - \sigma_w < 2|M_{s1}|h_1H_{c1}$$

$$-2M_{s2}h_2H_3 - \sigma_w < 2|M_{s2}|h_2H_{c2}$$

The operating temperature and the temperature of the magnetic recording medium during reproducing need to meet those conditions. When a further external magnetic field $H_{ex}$, for example, as shown in FIG. 1, is applied, in addition to the third external magnetic field $H_3$, to the thermomagnetic recording medium, further conditions to align the magnetization direction during preservation, which will be described hereinafter, in addition to the foregoing conditions need to be satisfied. The positive direction of the external magnetic field $H_{ex}$ is the same as that of the external magnetic field $H_3$, and hence, in some cases, $H_{ex} < 0$. First, conditions for restraining the mode A from changing are obtained by substituting $H_3$ of the foregoing expressions by $H_{ex}$. Conditions for restraining the mode B from changing to mode C are $$2M_{s1}h_1H_{ex} + 2M_{s2}h_2H_{ex} < 2|M_{s1}|h_1H_{c1} + 2|M_{s2}|h_2H_{c2}$$

$$2M_{s1}h_1H_{ex} - \sigma_w < 2|M_{s1}|h_1H_{c1}$$

$$2M_{s2}h_2H_{ex} - \sigma_w < 2|M_{s2}|h_2H_{c2}$$

Although the conditions for reproducing and preservation have been explained with reference to the variation of the modes A, B and C, the same transition of the modes is possible when the modes A, B and D are used when the direction of magnetization of the second magnetic thin film 4 in the initial state is opposite to that explained hereinbefore. In such a case, the modes A, B, C and D correspond to the modes B, A, D, and C in the foregoing description, respectively. Thus, the mode D at the completion ot overwrite is changed to the mode A which is suitable for reproducing and preservation.

G-6. Example of the Thermomagnetic Recording Medium-(1)

Concrete examples of magnetic materials for forming the magnetic thin films 3 and 4 of the double-layer magnetic film 5 of the thermomagnetic recording medium 10 will be described hereinafter.

RE-TM ferrimagnetic thin films serving as the first magnetic thin film 3 and the second magnetic thin film 4 were formed in that order over a glass plate serving as the transparent substrate 1 (FIG. 2) by a DC magnetron sputtering apparatus to form a double-layer magnetic film 5. In this case, the dielectric film 2 was omitted. The RE-TM ferrimagnetic thin films 3 and 4 were formed by alternately superposing RE (rare earth metal) and TM (transition metal) layers. To prevent the oxidation of the double-layer magnetic film 5 consisting of the magnetic thin films 3 and 4, the double-layer magnetic film 5 was coated with a protective film 6 having a thickness of 800 angstroms (the lower surface in FIG. 2). The individual films were formed under the same conditions as those for forming the double-layer magnetic film 5. The magnetic characteristics of the films and the interface wall energy density σw were evaluated. The materials, film thickness and characteristics at the room temperature of the magnetic thin films 3 and 4 are tabulated in Table 1.

TABLE 1

|  | First magnetic thin film | Second magnetic thin film |
| --- | --- | --- |
| Material | TbFe | GdTbFeCo |
| Thickness (Å) | 310 | 1500 |
| Curie point (°C.) | 137 | 192 |
| Saturation magnetization (emu/cm$^3$) | 95 | 145 |
| Coercive force (kOe) | 9.8 | 2.6 |

In both the first magnetic thin film 3 and the second magnetic thin film 4, the sublattice magnetization of the RE is greater than that of the TM (RE rich) at the room temperature. The interface magnetic wall energy density at the room temperature was 2.0 erg/cm$^2$ which was calculated by comparing the MH Loops of the respective single layer films and the double-layer film.

An external magnetic field of 20 kOe was applied to the thermomagnetic recording medium having the double-layer magnetic film 5 thus formed to initialize the double-layer magnetic film 5 in the mode A shown in FIG. 4. Then, the thermomagnetic recording medium was heated to a temperature T with the external magnetic field $H_1$ (FIG. 1) of 0.3 kOe applied thereto, and then the thermomagnetic recording medium was cooled to the room temperature. During the heating and cooling process, the thermomagnetic recording medium was irradiated from the side of the transparent substrate 1 (the glass plate) by a linearly polarized light of 830 nm in wavelength to observe the condition of magnetization by Kerr effect. When the temperature T was 150° C., the mode A of magnetization remained unchanged after heating and cooling. When the temperature T was 200° C., the mode of magnetization changed from the mode A to the mode B, in which the respective directions of magnetization of the magnetic thin films 3 and 4 were inverted after heating and cooling.

Then, the external magnetic field $H_2$ (FIG. 1) of 5 kOe was applied to the thermomagnetic recording medium which was in the mode B at the room temperature, whereby the mode of magnetization of the double-layer magnetic film 5 was caused to changed from the mode B to the mode C. When the external magnetic field $H_2$ was applied to the thermomagnetic recording medium in the mode A, the mode of magnetization remained unchanged.

The same thermomagnetic recording medium in the mode C at the room temperature was heated to the temperature T with the external magnetic field $H_1$ applied thereto, and then the thermomagnetic recording medium was cooled to the room temperature. When the temperature T was 150° C., the mode of magnetization was the mode A after heating and cooling, while the mode of magnetization was the mode B after heating and cooling, when the temperature T was 200° C.

The sample double-layer magnetic film subjected to the measurement meets the conditions for overwriting described in article G-4. at temperatures: the room temperature, 50° C., 75° C., 100° C., 125° C. and 150° C. At temperatures other than those temperatures, since $M_s'$ $1/H_c$ and σw vary continuously, it is considered that, substantially, the foregoing conditions are satisfied. The value of the external magnetic field necessary for changing the mode of magnetization at each temperature agreed well with the value calculated on the basis of the expressions representing the conditions, from which it is apparent that the foregoing expressions representing the conditions for overwriting provides appropriate conditions for the practical application of the thermomagnetic recording method of the present invention.

Figure 5:
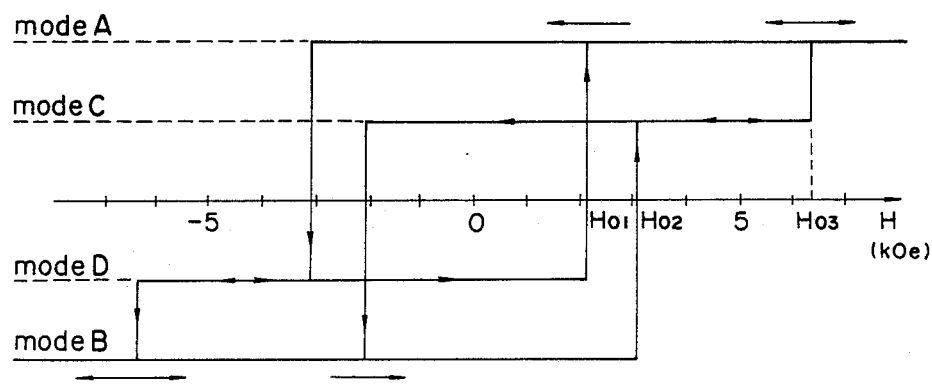
FIG. 5 is a diagram showing the variation of mode of magnetization with the variation of the intensity of an external magnetic field.

FIG. 5 shows the transition of the mode of magnetization of the double-layer magnetic film 5 consisting of the magnetic thin films 3 and 4 having properties shown in Table 1 with the variation of the external magnetic field H at the room temperature. In FIG. 5, $H_{01}$ is intensity of the external magnetic field where the transition of the mode D to the mode A (or the mode C to the mode B) occurs; $H_{02}$ is intensity of the same where the transition of the mode B to the mode C (or the mode A to the mode D) occurs; $H_{03}$ is intensity of the same where the transition of the mode C to the mode A (or the mode D to the mode B) occurs. The intensity of the external magnetic field causing the transition of the mode of magnetization was measured on the basis of Kerr effect. From the intensity of the external magnetic field $H_{03}$ and the data shown in Table 1, calculated interface wall energy density σw equals to 2.0 erg/cm$^2$. The calculated values of $H_{01}$ and $H_{02}$ calculated by using the calculated interface wall energy density σw agreed well with the measured values, respectively.

Referring to FIG. 5, when the mode of magnetization during recording is either the mode A or the mode C (or either the mode B or the mode D), the reproduction of recording bits in the modes A or B is possible when an external magnetic field of a magnetic intensity of $H_{exA}$ (or $H_{exB}$) meeting $$-H_{01} < H_{exA} < -H_{02} \text{ (or } H_{01} < H_{exB} < H_{02})$$

is applied to the double-layer magnetic film.

When the mode of magnetization of the double-layer magnetic film 5 is the mode A or the mode B in reproducing recorded signals, both the magnetic thin films 3 and 4 of the double-layer magnetic film 5 are available for reading the signals, which improves the SN ratio of the reproduced signals as mentioned above as compared with the SN ratio of the reproduced signals reproduced from the double-layer magnetic film 5 in the mode C (or the mode D).

When the mode of magnetization at the end of overwrite is either the mode A or the mode C (or either the mode B or the mode D), preservation and reproduction in the mode A or the mode B are possible by applying an external magnetic field of $H_{exA}$ (or $H_{exB}$) meeting the foregoing condition to the double-layer magnetic film 5. If another magnetic field of $H_{exC}$ is applied to the double-layer magnetic film 5 in applying the external magnetic field of $H_{exA}$ (or $H_{exB}$) is applied, in preservation or in reproduction, an inequality:

$$-H_{02} < H_{exC} < H_{02} \text{ (or } -H_{02} < H_{exD} < H_{02})$$

must be satisfied.

G-7. Another Embodiment

Figure 6:
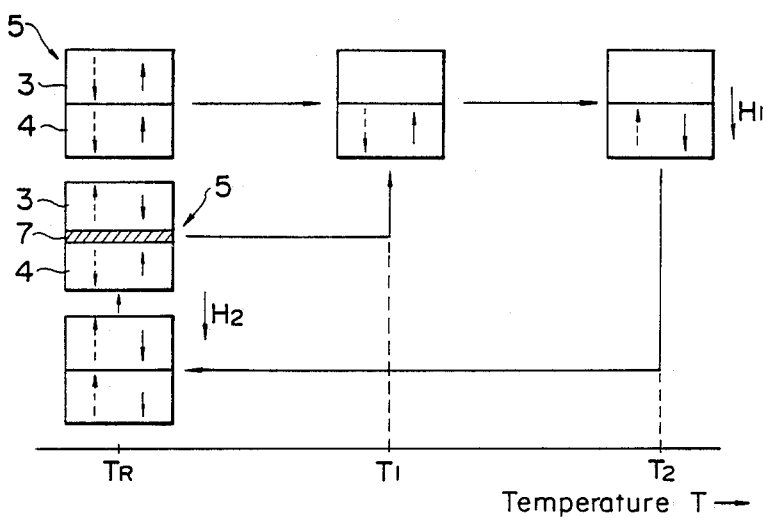
FIG. 6 is an illustration of assistance in explaining another embodiment of the present invention, showing modes of magnetization.

In the embodiment shown in FIG. 1, when the magnetic compensating point of the second magnetic thin film 4 is between the room temperature and the temperature $T_2$, the external magnetic fields of $H_1$ and $H_2$ are in the same direction as shown in FIG. 6.

Figure 7:
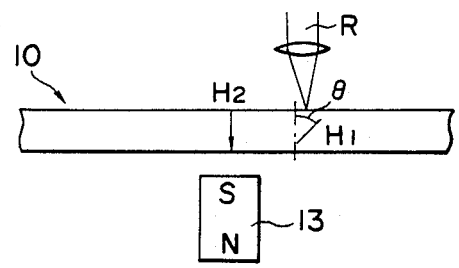
FIG. 7 is a schematic, fragmentary view of assistance in explaining a manner of applying an external magnetic field to a thermomagnetic recording medium, in another embodiment of the present invention.

When the external magnetic fields of $H_1$ and $H_2$ are the same in the direction of magnetic field as shown in FIG. 6, both the external magnetic fields of $H_1$ and $H_2$ can be formed by a single magnet 13 as shown in FIG. 7. A thermomagnetic recording medium 10 is irradiated by a laser light R at a position near the magnet 13 where the intensity of the magnetic field of the magnet 13 is not the maximum, so that the intensity $H_1$ of the external magnetic field at the irradiated position is smaller than the intensity $H_2$ ($H_1 < H_2$).

Further embodiment will be described hereinafter, in which the external magnetic field $H_2$ is not required to change the mode B into the mode C, when the second magnetic thin film has a magnetic compensation temperature between room temperature and recording temperature $T_2$. In this embodiment a similar double-layer magnetic film 5, as shown in FIG. 2, is employed and the magnetization condition changes as shown in FIG. 8.

Figure 8:
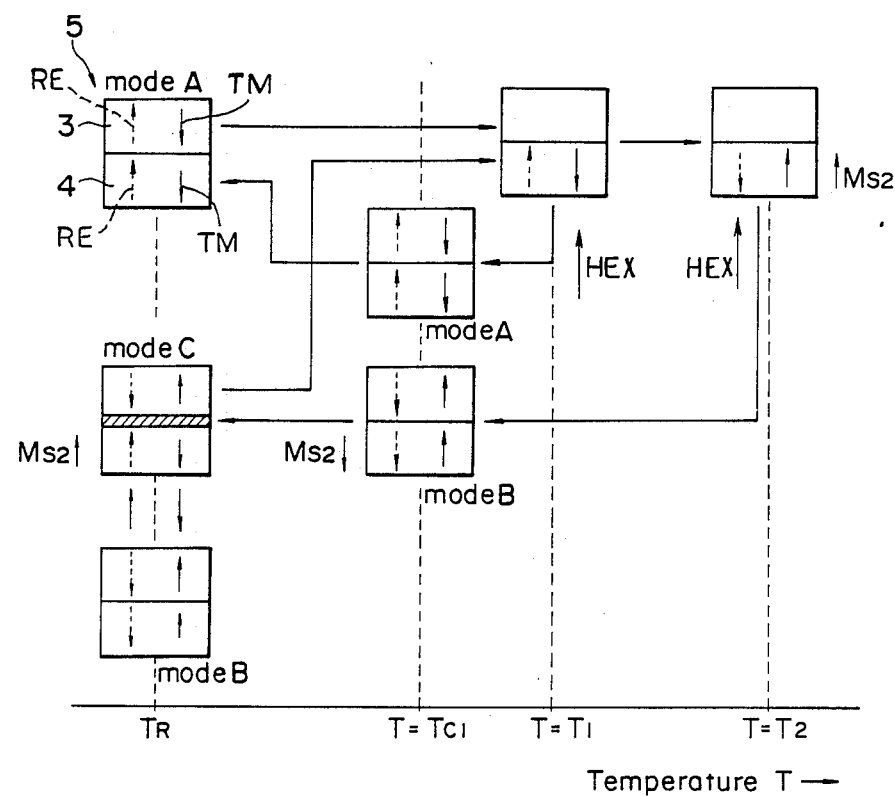

Referring to FIG. 8, a double-layer magnetic film 5 has a recording portion in which the respective directions of the respective magnetic moments of a first magnetic thin film 3 and a second magnetic thin film 4, which are coupled magnetically, are the same (mode A) and a recording portion in which the respective directions of the respective magnetic moments of the magnetically coupled first magnetic thin film 3 and the second magnetic thin film 4 are opposite to each other (mode C). When the film (in mode A) is heated in a heating mode in which the superposed magnetic film is heated at a temperature $T_1$ which is higher than the Curie temperature $T_{C1}$ of the first magnetic thin film 3, there is no inversion of the sublattice magnetization of the second magnetic thin film 4. When the film is heated in a heating mode in which the superposed magnetic film 5 is heated at a temperature $T_2$ which is higher than the Curie temperature $T_{C1}$ there is an inversion of the sublattice magnetization of the second magnetic thin film 4. Thus, by modulating the heating condition, an information signal is recorded, and then the heated superposed magnetic film 5 is cooled for permanently recording the magnetic moment in the thermomagnetic recording medium. The second magnetic thin film 4 has a compensation temperature between the room temperature and the temperature $T_2$ at which the superposed magnetic film 5 is heated in the first heating mode. The direction of the sublattice magnetization of the second magnetic thin film 4 is inverted during the course of cooling.

Figure 10:
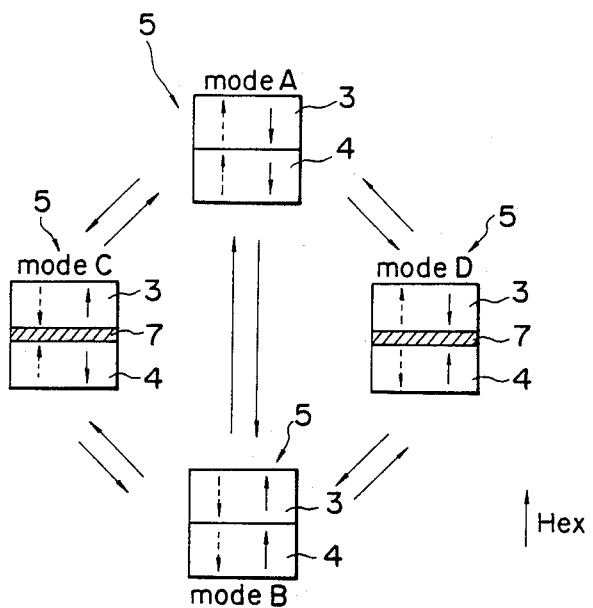

Possible modes of the double-layer laminated magnetic film 5 formed by laminating the magnetic thin films 3 and 4 of a RE-TM alloy (in a temperature range below the respective Curie temperatures $T_{C1}$ and $T_{C2}$ of the magnetic thin films 3 and 4), are manifested by four modes A to D as shown in FIG. 10. The respective easy directions of magnetization of the magnetic thin films 3 and 4 are perpendicular to the surface of the thin films, namely, the magnetic thin films 3 and 4 are so-called perpendicular anisotropy magnetic thin films.

Referring to FIG. 10, in the modes A and B, the respective directions of the respective magnetic moments of the respective TMs of the first magnetic thin film 3 and the second magnetic thin film 4 are the same as indicated by arrows shown by solid lines, and those of the REs of the magnetic thin film 3 and the magnetic thin film 4 are the same as indicated by arrows shown by broken lines. In the modes C and D, the respective directions of the respective magnetic moments of the respective TMs of the first magnetic thin film 3 and the second magnetic thin film 4 are opposite to each other as indicated by arrows shown by solid lines in FIG. 10, and those of the REs of the first magnetic thin film 3 and the second magnetic thin film 4 are opposite to each other as indicated by arrows shown by broken lines in FIG. 10, so that a region where the directions of the magnetic moment of TM and the magnetic moment of RE change through an angle of 180° C., namely, an interface magnetic wall, is formed in the interface of the first magnetic thin film 3 and the second magnetic thin film 4. This interface magnetic wall is designated as an interface wall 7. An interface magnetic wall energy per unit area ($\sigma w$ erg/cm²) is stored in the interface wall 7.

G-8. Change of Mode of Magnetization According to Temperature Variation-(2)

Change of the mode of magnetization of the magnetic thin films of the superposed magnetic film 5 with temperature variation caused by laser irradiation or the like will be described with reference to FIG. 8, in which arrows of solid lines shown in the magnetic thin films 3 and 4 indicate the magnetic moment (magnetization) of TM (transition metal) and arrows of broken lines indicate the magnetic moment (magnetization) of Re (rare earth metal).

Figure 9:
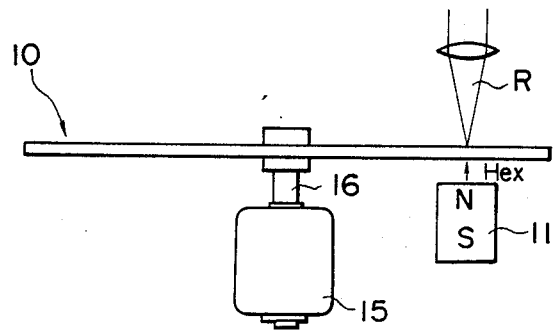
Figure 11:
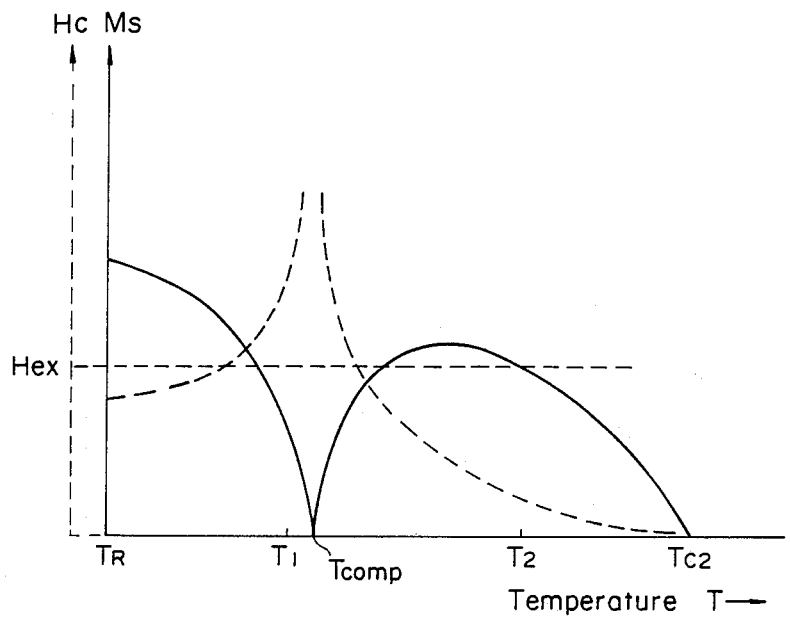
FIG. 11 is a graph showing the temperature dependency of the coercive force and magnetization of magnetic thin film used in one embodiment.

Suppose that a recording bit of the double-layer magnetic film 5 of the thermomagnetic recording medium 10 is in the mode A (FIG. 8) at the room temperature $T_R$, and the bit of the superposed magnetic film 5 in the mode A is irradiated by laser light for recording. The intensity of the laser light or the duration of laser irradiation is controlled according to a recording signal to heat the laminated magnetic film 5 selectively to a first temperature $T_1$ or to a second temperature $T_2$. The first temperature $T_1$ is higher than the Curie temperature $T_{C1}$ of the first magnetic thin film 3 and is a temperature at which the inversion of the sublattice magnetization of the second magnetic thin film 4 will not occur when the second magnetic thin film 4 is subjected to the influence of an external magnetic field $H_{ex}$, which will be described hereinafter, while the second temperature $T_2$ is higher than the first temperature $T_1$ and the compensation temperature of the second magnetic thin film 4, and is a temperature high enough to cause the inversion of the sublattice magnetization of the second magnetic thin film 4 when the second magnetic thin film 4 is subjected to the influence of the external magnetic field $H_{ex}$. FIG. 11 shows the temperature characteristics of the magnetization and the coercive force of the second magnetic thin film 4. The second magnetic thin film 4 has a compensation temperature $T_{comp}$ between the room temperature $T_R$ and the second temperature $T_2$. Qualitatively, the intensity of the external magnetic field $H_{ex}$ is greater than the coercive force $H_c$ ($H_{ex} > H_c$) at the room temperature $T_R$ and at the second temperature $T_2$, and the coercive force $H_c$ is greater than the intensity of the external magnetic field $H_{ex}$ ($H_{ex} < H_c$) at the temperature $T_1$ and at the compensation temperature $T_{comp}$. Accordingly, the direction of sublattice magnetization of the second magnetic thin film 4 is inverted at the room temperature $T_R$ and at the temperature $T_2$ by the external magnetic field $H_{ex}$ of the magnet 11 which is shown in FIG. 9. More strict quantitative conditions will be described in article G-9.

In the initial condition in the mode A, the total magnetization of the second magnetic thin film is pointing upward in FIG. 8 because the sublattice magnetization of RE (shown as a dashed arrow) is larger than that of TM (shown as a solid arrow). When the temperature of the superposed thin film 5 is raised over the compensation temperature $T_{comp}$ (FIG. 11), the total magnetization of the second magnetic thin film 4 is pointing downward because over the compensation temperature the sublattice magnetization of TM is larger than that of RE, as shown in FIG. 11. When the temperature is further raised to $T_2$, the total magnetization $M_{s2}$ again inverted to follow the direction of the external magnetic field $H_{ex}$. In other words, the sublattice magnetizations are inverted at the temperature $T_2$ under the influence of the external magnetic field $H_{ex}$. Upon cooling the superposed magnetic film 5 to the temperature $T_{C1}$ after the same has been heated to the temperature $T_1$ or $T_2$, spontaneous magnetization appears again in the first magnetic thin film 3, in which the exchange energy between the first magnetic thin film 3 and the second magnetic thin film 4 is more dominant than the Zeeman energy of the external magnetic field in determining the direction of the magnetic moment of the first magnetic thin film 3. That is, the saturation magnetization $M_{s1}$ and the film thickness $h_1$ of the first magnetic thin film 3 in relation to the external magnetic field $H_{ex}$ and the interface wall energy density $\sigma w$ are decided selectively so as to meet an inequality $$\sigma_w > 2|M_{s1}|h_1|H_{ex}$$

at a temperature near the temperature $T_{c1}$ at which a spontaneous magnetization appears in the first magnetic thin film 3. Accordingly, when the temperature T of the thermomagnetic recording medium coincides with the temperature $T_{C1}$, mode A or B is established, in which the respective directions of the respective magnetization of the magnetic thin films 3 and 4 of the superposed magnetic film 5 are the same. The mode A is established when the heating temperature is $T_1$, and the mode B is established when the heating temperature is $T_2$.

When the recording bit of the thermomagnetic recording medium is cooled further, for example, to a temperature near the room temperature $T_R$, the initial mode A is established in the bit, or the mode B, in which the direction of the magnetic moment is opposite to that of the initial state, is established. However, to meet the conditions for the transition of the mode of magnetization from the mode B to the mode C, the magnetic moment of the second magnetic thin film 4 is inverted, and thereby the mode of magnetization of the laminated magnetic film 5 assumes the mode C as shown in FIG. 10.

During the course of cooling from the temperature $T_2$, the direction of the total magnetization $M_{s2}$ is changed from the $M_{s2}$ at $T_2$, just cooled to lower temperature than the compensation temperature. Though the superposed thin film 5 is still under influence of the external magnetic field $H_{ex}$, the total magnetization of the magnetic thin film 4 again is changed the direction to point upward as shown in FIG. 8, the mode C, since RE>TM.

When a recording bit in the mode C of the superposed magnetic film 5 of the thermomagnetic recording medium 10 is heated to a temperature above the temperature $T_{C1}$, the magnetization of the first magnetic thin film disappears and the same mode of magnetization as that of a recording bit heated from the initial mode A is established in the recording bit. Accordingly, the mode of a recording bit heated to the temperature $T_1$ and then cooled becomes the mode A, while the mode of a recording bit heated to the temperature $T_2$ and then cooled becomes the mode C. Therefore, the mode of recording magnetization is dependent on the heating temperatures $T_1$ and $T_2$.

Thus, a recording bit in which the respective directions of the magnetically coupled magnetic moments of the first magnetic thin film 3 and second magnetic thin film 4 of the superposed magnetic film 5 are the same, namely, a recording bit in the mode A, and a recording bit in which the respective directions of magnetically coupled magnetic moments of the first magnetic thin film 3 and the second magnetic thin film 4 are opposite to each other, namely, a bit in the mode C, are heated to the temperature $T_1$ or $T_2$ by regulating the heating condition according to information signals to establish a new mode of magnetization in the recording bit to enable overwrite irrespective of the initial mode of magnetization of the recording bit.

G-9. Conditions for Overwrite-(2)

Conditions for overwrite will be described hereinafter.

In changing the temperature T of the superposed magnetic film 5 under the influence of the external magnetic field $H_{ex}$ as shown in FIG. 8, conditions for restraining the mode A from changing to the other modes in the temperature range from the room temperature $T_R$ to a temperature below the Curie temperature $T_{C1}$ of the first magnetic thin film 3 ($T_R \leq Y < T_{c1}$) are expressed by inequalities:

$$-2M_{s1}h_1H_{ex} - 2M_{s2}h_2H_{ex} < 2|M_{s1}|h_1H_{c1} + 2|M_{s2}|h_2H_{c2}$$

$$-2M_{s1}h_1H_{ex} - \sigma_w < 2|M_{s1}|h_1H_{c1}$$

$$-2M_{s2}h_2H_{ex} - \sigma_w < 2|M_{s2}|h_2H_{c2}$$

and conditions for restraining the mode C from changing are expressed by inequalities:

$$2M_{s1}h_1H_{ex} + \sigma_w < 2|M_{s1}|h_1H_{c1}$$

$$-2M_{s2}h_2H_{ex} + \sigma_w < 2|M_{s2}|h_2H_{c2}$$

A condition for restraining the inversion of the sublattice magnetization of the second magnetic thin film 4 while the temperature T of the superposed magnetic film 5 is in the range from a temperature above the temperature $T_{C1}$ to a temperature below the second temperature $T_2$ ($T_{C1} < T < T_2$) is expressed by an inequality:

$$|H_{ex}| < H_{c2}$$

and a condition for causing the inversion of the sublattice magnetization of the second magnetic thin film 4 when the temperature T of the superposed magnetic film 5 is above the temperature $T_2$ ($T > T_2$) is expressed by an inequality:

$$|H_{ex}| > H_{c2}$$

In cooling the superposed magnetic film 5 after heating the same to such a temperature, a condition for allowing the magnetization of the first magnetic thin film 3 is determined by the exchange energy with the magnetization of the second magnetic thin film 4 upon the fall of the temperature T of the recording bit of the superposed magnetic film 5 of the thermomagnetic recording medium 10 near to the Curie temperature $T_{C1}$ of the first magnetic thin film 3 (T is approximately equal to $T_{c1}$) is:

$$\sigma_w > 2|M_{s1}|h_1|H_{ex}|$$

and conditions for restraining the mode A from changing to the other modes in the temperature range of $T_R \leq T < T_{C1}$ are the same as those for the heating process, while conditions for allowing the transition of the mode B to the mode C are:

$$2M_{s1}h_1H_{ex} + 2M_{s2}h_2H_{ex} < 2|M_{s1}|h_1H_{c1} + 2|M_{s2}|h_2H_{c2}$$

$$2M_{s1}h_1H_{ex} - \sigma_w < 2|M_{s1}|h_1H_{c1}$$

$$2M_{s2}h_2H_{ex} - \sigma_w > 2|M_{s2}|h_2H_{c2}$$

When all the foregoing conditions for overwrite are satisfied by the superposed magnetic film 5, overwrite is feasible.

While the thermomagnetic recording medium is preserved at the room temperature, naturally, the mode A is maintained, however, the mode C may be maintained or the transition of the mode C to the mode B may occur.

Conditions for maintaining the mode C are:

$$\sigma_w < 2|M_{s1}|h_1H_{c1}$$

$$\sigma_w < 2|M_{s2}|h_2H_{c2}$$

and conditions for allowing the transition of the mode C to the mode B are:

$$\sigma_w < 2|M_{s1}|h_1H_{c1}$$

$$\sigma_w > 2|M_{s2}|h_2H_{c2}$$

Thus, the least necessary condition for the mode C is to satisfy either one of the sets of conditions.

When the conditions for restraining the transition of the mode C to other mode among those conditions for overwrite are not satisfied partly, namely, when the mode of magnetization changes from the mode C to the mode A while the thermomagnetic recording medium is heated from the room temperature $T_R$ to the Curie temperature $T_{C1}$ of the first magnetic thin film 3 ($T_R < T < T_{c1}$), there must be a temperature TCA to provide $$2M_{s1}h_1H_{ex} - \sigma_w 2|M_{s1}|h_1H_{c1} = 2|M_{s1}|h_1H_{c1}$$

in that temperature range. In such a case, a necessary condition for overwrite is:

$$T_{BC} < T_{CA}$$

where $T_{BC}$ is a temperature at which the mode of magnetization changes from the mode B to the mode C while the thermomagnetic recording medium is cooled after being heated to the temperature $T_2$. However, even if this condition is not satisfied, overwrite is possible when the inversion of the magnetic moment of the first magnetic thin film 3 does not occur while the temperature drops from the temperature $T_{BC}$ to the temperature $T_{CA}$. Naturally, the temperature T of the thermomagnetic recording medium must be below the temperature $T_{CA}$ during reproduction, when there is such a temperature $T_{CA}$.

Although the variation of mode of magnetization has been explained in the foregoing description with reference to the modes A, B and C, overwrite is possible when the modes A, B and D are employed when the initial direction of magnetic moment of the second magnetic thin film 4 is turned in the opposite direction. That is, in the latter case, the modes A, B, C and D correspond to the modes B, A, D and C of the foregoing embodiment, respectively, and the saturation magnetic flux density $M_s$ is defined by:

$$M_s = M_{TM} - M_{RE}$$

to apply the foregoing conditions for overwrite without change.

G-10. Mode of Magnetization for Reproduction and Preservation-(2)

As explained previously, problems occur in reproducing recorded information or in preserving the thermomagnetic recording medium, when there are recording bits in which the directions of the sublattice magnetic moments are antiparallel. Accordingly, it is desirable that the direction of sublattice magnetization of the second magnetic thin film 4 and the direction of sublattice magnetization of the first magnetic thin film 3 are the same in reproducing recorded information or in preserving the thermomagnetic recording medium.

Conditions for making the respective directions of sublattice magnetization of the first and second magnetic thin films parallel will be described hereinafter. Conditions for changing the mode of magnetization from the mode C to the mode B by applying another external magnetic field $H_{ex1}$ (the positive direction of the magnetic field is indicated by the arrow indicating the direction of the external magnetic field $H_{ex}$) to a magnetic recording medium having recording bits in the modes A and C are:

$$2M_{s1}h_1H_{ex1} \sigma_w < 2|M_{s1}|h_1H_{c1}$$

$$-2M_{s2}h_2H_{ex1} \sigma_w > 2|M_{s2}|h_2H_{c2}$$

Naturally, the following conditions for inhibiting the transition of the mode A to the other mode, in addition to the foregoing conditions, must be satisfied.

$$-2M_{s1}h_1H_{ex1} - 2M_{s2}h_2H_{ex1} < 2|M_{s1}|h_1H_{c1} - 2|M_{s2}|h_2H_{c2}$$

$$-2M_{s1}h_1H_{ex1} - \sigma_w < 2|M_{s1}|h_1H_{c2}$$

$$-2M_{s2}h_2H_{ex1} - \sigma_w < 2|M_{s2}|h_2H_{c2}$$

The operating temperature and the temperature of the thermomagnetic recording medium during reproducing need to meet those conditions. When a further external magnetic field $H_{ex2}$ is applied to the thermomagnetic recording medium, further conditions, which will be described hereinafter, in addition to the foregoing conditions need to be satisfied. The positive direction of the external magnetic field $H_{ex2}$ is the same as that of the external magnetic field $H_{ex1}$ and hence, in some cases, $H_{ex2} < 0$. First, conditions for restraining the mode A from changing are obtained by substituting the $H_{ex1}$ of the foregoing inequalities by $H_{ex2}$. Conditions for restraining the mode B established by changing the mode C from changing are:

$$2M_{s1}h_1H_{ex2} + 2M_{s2}h_2H_{ex2} < 2|M_{s1}|h_1H_{c1} + 2|M_{s2}|h_2H_{c2}$$

$$2M_{s1}h_1H_{ex2} - \sigma_w < 2|M_{s1}|h_1H_{c2}$$

$$2M_{s2}h_2H_{ex2} - \sigma_w < 2|M_{s2}|h_2H_{c2}$$

Although the conditions for reproducing and preservation have been explained with reference to the variation of the modes A, B and C, the same transition of the modes is possible when the modes A, B and D are used when the direction of magnetization of the second magnetic thin film 4 in the initial state is opposite to that explained hereinbefore. In such a case, the modes A, B, C and D correspond to the modes B, A, D and C in the foregoing description, respectively. Thus, the mode D at the completion of overwrite is changed to the mode A which is suitable for reproducing and preservation.

G-11. Example of the Thermomagnetic Recording Medium-(2)

Concrete examples of magnetic materials for forming the magnetic thin films 3 and 4 of the superposed magnetic film 5 of the thermomagnetic recording medium 10 will be described hereinafter.

RE-TM ferrimagnetic thin films serving as the first magnetic thin film 3 and the second magnetic thin film 4 were formed in that order over a glass plate serving as the transparent substrate 1 by a DC magnetron sputtering apparatus to form a superposed magnetic film 5. In this case, the dielectric film 2 was omitted. The RE-TM ferrimagnetic thin films 3 and 4 were formed by alternately laminating RE (rare earth metal) and TM (transition metal) layers. To prevent the oxidation of the superposed magnetic film 5 consisting of the magnetic thin films 3 and 4, the superposed magnetic film 5 was coated with a protective film 6 having a thickness of 800 angstroms (the lower surface in FIG. 2). The individual films were formed under the same conditions as those for forming the laminated magnetic film 5. The magnetic characteristics of the films and the magnetic domain wall energy density $\sigma_w$ were evaluated. The materials, film thickness and characteristics at the room temperature of the magnetic thin films 3 and 4 are tabulated in Table 2.

TABLE 2

|  | First magnetic thin film | Second magnetic thin film |
|---|---|---|
| Material | TbFe | GdTbFeCo |
| Thickness (Å) | 310 | 2000 |
| Curie point (°C.) | 135 | 202 |
| Saturation magnetization (emu/cm$^2$) | 115 | 134 |
| Coercive force (kOe) | 9.2 | 1.8 |

In both the first magnetic thin film 3 and the second magnetic thin film 4, the sublattice magnetization of RE is greater than that of TM (RE rich) at the room temperature. The respective magnetic compensation points of the first magnetic thin film 3 and the second magnetic thin film 4 are temperatures around 130° C. and 155° C., respectively. The magnetic domain wall energy density $\sigma_w$ at the room temperature is 1.8 erg/cm$^2$.

An external magnetic field of 20 kOe was applied to the thermomagnetic recording medium having the superposed magnetic film 5 thus formed to initialize the superposed magnetic film 5 in the mode A as shown in FIG. 10. Then, the thermomagnetic recording medium was heated to a temperature T with the external magnetic field $H_{ex}$ (FIG. 1) of 2.3 kOe applied thereto, and then the thermomagnetic recording medium was cooled to the room temperature. During the heating and cooling process, the thermomagnetic recording medium was irradiated from the side of the transparent substrate 1 (the glass plate) by a linearly polarized light of 830 nm in wavelength to observe the condition of magnetization by Kerr effect. When the temperature T was 150° C., the mode A of magnetization remained unchanged after heating and cooling. When the temperature T was 200° C., the direction of the magnetization of the second magnetic thin film 3 occurred upon the arrival of the temperature of the thermomagnetic recording medium at 178° C. During the cooling process, the mode B was established when the thermomagnetic recording medium was cooled to 130° C. When the thermomagnetic recording medium was cooled further down to 47° C., the mode of magnetization changed from the mode B to the mode C, which was maintained when the thermomagnetic recording medium was cooled to the room temperature. The mode C remained unchanged when $H_{ex}=0$.

The same thermomagnetic recording medium in the mode C at the room temperature was heated and cooled with the external magnetic field $H_{ex}$ Of 2.3 kOe applied thereto. When the heating temperature T was 150° C., the mode of magnetization after heating and cooling was Mode A, while the mode of magnetization after heating and cooling was the mode B when the heating temperature T was 200° C.

The present invention is not limited to the foregoing embodiment. For example, the ferrimagnetic thin films of the superposed magnetic film employed in the foregoing embodiment may be substituted by ferromagnetic thin films.

Although the present invention has been described in the preferred embodiment thereof, in which the magnetic coupling energy between the two magnetic thin films is produced by the exchange coupling of the magnetic thin films, the magnetic coupling energy may be produced by the magnetostatic coupling or by the exchange coupling and magnetostatic coupling of the two magnetic thin films.

According to the thermomagnetic recording method of the present invention, the intensity of a heating beam such as, for example, a laser beam, or the duration of irradiation by the heating beam is modulated according to information signals to regulate the heating temperature at which the thermomagnetic recording medium is heated between first and second heating temperatures for the effective recording of information in the thermomagnetic recording medium.

We claim as our invention:

1. A thermomagnetic recording method comprising the steps of;
   (a) providing a thermomagnetic recording medium having a magnetic recording layer formed of first and second magnetic thin films magnetically coupled with each other, said second magnetic thin film having an initial magnetic moment in a first direction,
   (b) heating said magnetic recording layer to a first temperature $T_1$ which is higher than a Curie temperature $T_{c1}$ of said first magnetic thin film and does not cause the inversion of said initial magnetic moment of said second magnetic thin film, (c) cooling said magnetic recording layer from said first temperature while applying an external magnetic field in a direction opposite to the direction of magnetization of said second magnetic thin film to derive, a magnetic moment in said first magnetic thin film which is in same direction as said initial magnetic moment in said second magnetic thin film, (d) heating said magnetic recording layer to a second temperature $T_2$ which is higher than said Curie temperature $T_{c1}$ and enough to cause the inversion of said initial magnetic moment in said second magnetic thin film, (e) cooling said magnetic recording layer from said second temperature $T_2$ while applying said external magnetic field to derive, a magnetic moment in said first magnetic thin film which is opposite in direction from said initial magnetic moment following the inversion of the magnetic moment in said second magnetic thin film, wherein said first and second heating states are modulated according to a signal to be recorded.

2. A thermomagnetic recording method comprising the steps of;
 (a) providing a thermomagnetic recording medium having a magnetic recording layer formed of first and second magnetic thin films magnetically coupled with each other, said second magnetic thin film having an initial magnetic moment in a first direction,
 (b) heating said magnetic recording layer to a first temperature $T_1$ which is higher than a Curie temperature $T_{c1}$ of said first magnetic thin film and does not cause the inversion of said initial magnetic moment of said second magnetic thin film,
 (c) cooling said magnetic recording layer from said first temperature while applying an external magnetic field in a direction opposite to the direction of magnetization of said second magnetic thin film, to derive a magnetic moment in said first magnetic thin film which is in same direction as said initial magnetic moment in said second magnetic thin film,
 (d) heating said magnetic recording layer to a second temperature $T_2$ which is higher than said Curie temperature $T_{c1}$ and enough to cause the inversion of said initial magnetic moment in said second magnetic thin film,
 (e) cooling said magnetic recording layer from said second temperature $T_2$ while applying said external magnetic field, to derive a magnetic moment in said first magnetic thin film which is opposite in direction from said initial magnetic moment following the inversion of the magnetic moment in said second magnetic thin film, wherein said first and second heating states are modulated according to a signal to be recorded,
 (f) applying, after said cooling steps, a magnetic field to said magnetic recording layer to cause inversion of magnetic moment in said second magnetic thin film to align said magnetic moment with said initial magnetic moment, while holding the direction of the magnetic moment in said first magnetic thin film.

3. A thermomagnetic recording method comprising the steps of;

(a) providing a thermomagnetic recording medium having a magnetic recording layer formed of first and second magnetic thin films magnetically coupled with each other, said second magnetic thin film having an initial sublattice magnetization in a first direction, (b) heating said magnetic recording layer to a first temperature $T_1$ which is higher than a Curie temperature $T_{c1}$ of said first magnetic thin film and does not cause the inversion of said initial sublattice magnetization of said second magnetic thin film, (c) cooling said magnetic recording layer from said first temperature while in an external magnetic field, to derive a sublattice magnetization in said first magnetic thin film which is in same direction as said sublattice magnetization in said second magnetic thin film, (d) heating said magnetic recording layer to a second temperature $T_2$ which is higher than said Curie temperature $T_{c1}$ and enough to cause the inversion of said initial sublattice magnetization in said second magnetic thin film, (e) cooling said magnetic recording layer while in an external magnetic field from said second temperature $T_2$, to a room temperature $T_R$, said second magnetic thin film having a compensation temperature Tcomp between the room temperature $T_R$ and said second temperature $T_2$, deriving a sublattice magnetization in said first magnetic thin film which is opposite in direction from said initial sublattice magnetization while inverting sublattice magnetization at the room temperature, wherein said first and second heating states are modulated according to a signal to be recorded.

4. A thermomagnetic recording and reproducing method comprising the steps of:
 (a) providing a thermomagnetic recording medium having a magnetic recording layer formed of first and second magnetic thin films magnetically coupled with each other, said second magnetic thin film having an initial magnetic moment in a first direction,
 (b) heating said magnetic recording layer to a first temperature $T_1$ which is higher than a Curie temperature $T_{c1}$ of said first magnetic thin film and does not cause the inversion of said initial magnetic moment of said second magnetic thin film,
 (c) cooling said magnetic layer from said first temperature while applying an external magnetic field in a direction opposite to the direction of magnetization of said second magnetic thin film, to drive a magnetic moment in said first magnetic thin film which is in same direction as said initial magnetic moment in said second magnetic thin film,
 (d) heating said magnetic recording layer to a second temperature $T_2$ which is higher than said Curie temperature $T_{c1}$ and enough to cause the inversion of said initial magnetic moment in said second magnetic thin film,
 (e) cooling said magnetic recording layer from said second temperature $T_2$ while applying said external magnetic field, to derive a magnetic moment in said first magnetic thin film which is opposite in direction from said initial magnetic moment following the inversion of the magnetic moment in said second magnetic thin film, wherein said first and second heating states are modulated according to a signal to be recorded, (f) applying, after said cooling steps, a magnetic field to said magnetic recording layer to cause inversion of magnetic moment in said second magnetic thin film to align said magnetic moment with said initial magnetic moment, while holding the direction of the magnetic moment in said first magnetic thin film, (g) and, upon reproducing said signal from said thermomagnetic recording medium, applying a magnetic field to said magnetic recording layer so that the respective directions of the respective magnetic moments of the first and second magnetic thin films are turned in the same direction prior to reading signals from said magnetic film, and reproducing signals from said magnetic thin film by means of a magnetooptic effect.

5. A thermomagnetic recording and reproducing method comprising the steps of;

(a) providing a thermomagnetic recording medium having a magnetic recording layer formed of first and second magnetic thin films magnetically coupled with each other, said second magnetic thin film having an initial sublattice magnetization in a first direction, (b) heating said magnetic recording layer to a first temperature $T_1$ which is higher than a Curie temperature $T_{c1}$ of said first magnetic thin film and does not cause the inversion of said initial sublattice magnetization of said second magnetic thin film, (c) cooling said magnetic recording layer from said first temperature while in an external magnetic field, to derive a sublattice magnetization in said first magnetic thin film which is in same direction as said sublattice magnetization in said second magnetic thin film, (d) heating said magnetic recording layer to a second temperature $T_2$ which is higher than said Curie temperature $T_{c1}$ and enough to cause the inversion of said initial sublattice magnetization in said second magnetic thin film, (e) cooling said magnetic recording layer while in an external magnetic field from said second temperature $T_2$, to a room temperature $T_R$, said second magnetic thin film having a compensation temperature Tcomp between the room temperature $T_R$ and said second temperature $T_2$, deriving a sublattice magnetization in said first magnetic thin film which is opposite in direction from said initial sublattice magnetization while inverting sublattice magnetization at the room temperature, wherein said first and second heating states are modulated according to a signal to be recorded, (g) and, upon reproducing said signal from said thermomagnetic recording medium, applying a magnetic field to said magnetic recording layer so that the respective directions of the respective sublattice magnetizations of the first and second magnetic thin films are turned in the same direction prior to reading signals from said magnetic film, and reproducing signals from said magnetic thin film by means of a magnetooptic effect.

* * * * *